DOCUMENT FEEDER WITH DELAYED PULSE GENERATOR CONTROL
Filed July 9, 1964
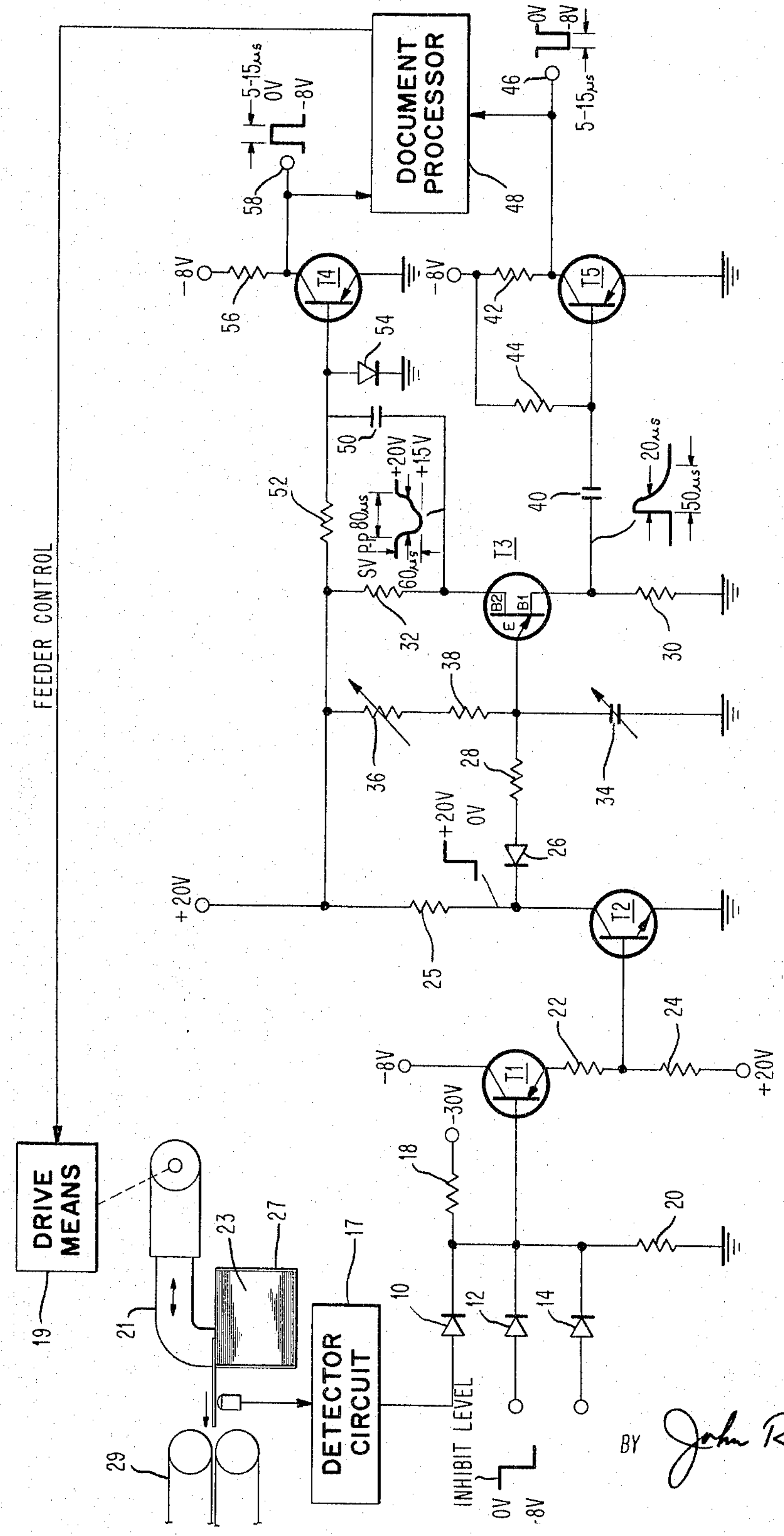
INVENTOR
ROBERT A. JONES
BY John R. Manning
ATTORNEY United States Patent Office 3,284,080
Patented Nov. 8, 1966

3,284,080

DOCUMENT FEEDER WITH DELAYED PULSE GENERATOR CONTROL

Robert A. Jones, Euless, Tex., assignor to Sperry Rand Corporation, New York, N.Y., a corporation of Delaware Filed July 9, 1964, Ser. No. 381,398
2 Claims. (Cl. 271—57)

This invention relates to a pulse generator and more specifically to a pulse generator capable of generating an output signal after a predetermined delay.

In many environments, there arises a need for generating an output signal at a predetermined time interval after application of an input signal to the generator. One such application is in the field of document sorting such as the sorting of bank checks, deposit slips, and the like. For example, after the feed bin or document hopper containing the documents becomes empty, the document processor and the document feeder control must be apprised of this condition so that they can function accordingly. It is necessary in this particular application of pulse generating means, that the processor be notified after a predetermined interval of time. In addition, it is a requirement that the circuitry respond even though the input signals to the pulse generator be applied randomly and not at a predetermined time in the computing cycle. This requires that the resulting output signal be immediately inhibited even though the pulse generator has commenced a cycle which would otherwise result in an output signal.

A known form of a delayed pulse generator embodies the application of an input signal to a delay line which then produces a delayed output at a time commensurate with the delay of the delay line. Another delayed pulse generator, which is commonly used, is a one-shot multivibrator. The multivibrator has a definite time period and will produce an output pulse at the end or expiration of its time period after application of an input signal. These prior art devices have many disadvantages. Unlike either of the known pulse generators just described, the generator of the present invention will not only supply delayed output signals as desired, but can be turned off at random thus immediately inhibiting the production of output signals. That is to say, once a signal is applied to a prior art delay line or a one-shot multivibrator, an output signal will be subsequently generated. The circuit of the present invention does not operate in this manner but immediately ceases to produce outputs upon the application of an input inhibit signal even though the pulse generator has commenced a cycle of operation which would otherwise result in an output signal.

Accordingly, it is the principal object of the present invention to improve pulse generators.

It is a further object of the present invention to improve pulse generators of the delayed action type.

It is a still further object of the present invention to provide a delayed pulse generator which is immediately responsive to an input condition.

It is another object of the present invention to provide a pulse generator of the triggerable oscillator type which is remarkably simple and dependable in operation.

It is another object of the present invention to provide a pulse generator capable of immediately inhibiting a document feeder control upon the expiration of documents in an input hopper.

The pulse generator of the present invention is designed to generate an output pulse after expiration of a predetermined delay period. The pulse generator will continue to supply output pulses with a definite time period until the direct coupled input level changes to the proper level to inhibit operation. The input inhibit level may be applied at random and the circuit immediately responds by ceasing generation of output signals. When the input inhibit level is removed, the output cycle of operation will occur; that is, the generation of output pulses after a definite delay period. The input inhibit level as previously set forth, may be applied at random and the minimum time for response is only the time necessary for permitting reset of the circuit elements. In a particular embodiment of the invention which was constructed and successfully operated, the nominal delay period from the time of input inhibit level removal to the generation of the first output pulse was 350 milliseconds. Once the input inhibit level is removed, a continuous train of output signals will be generated until the input inhibit level is again applied. The oscillating element employed in the circuit of the present invention is a unijunction transistor which provides simplicity and a high power output.

The above-mentioned and other objects and features of the invention will become more apparent and the invention itself will be best understood by reference to the following description taken in conjunction with the accompanying drawing wherein the figure is an electrical schematic of the pulse generator. The waveforms at various points on the circuit are shown on the figure.

Means are employed to detect the condition of the input document hopper each time a document is advanced. This means, such as the document presence detector, provides a signal to trigger the pulse generator. The output from the pulse generator is applied to the document processor which receives the signal that the last document or check has been advanced from the input hopper. The output from the pulse generator is also used to turn off the document sorter feed control mechanism. This is necessary to prevent the feed control mechanism being left, accidentally, in the "on" condition from the previous document run.

With reference to the figure, a transistor T1 is coupled to receive inputs on its base through one or more of the diodes 10, 12 or 14. A suitable input is shown to the diode 10 from a document presence photodiode 16 through a detector circuit 17. The photodiode 16 is positioned at the magnetic ink character recognition reading station (not shown) and through its detector circuit 17, transmits a signal when a document is present. A signal is transmitted each time a document is advanced.

A drive means 19 is under control of a signal on the feeder control conductor, as shown, and oscillates a document feeder 21 in such a manner to cyclically advance the document 23, from a document hopper 27 to a pair of advancing belts 29.

The photodiode 16 detects the passage of each document 23 from the hopper 27 to the advancing means 29. The photodiode 16 conditions its detector circuit 17 so that an 8-volt level is applied to the transistor T1 except when a document 23 passes the photodiode detector 16, at which time the inhibit level of zero volts is applied. In other words, the pulse generator is normally conditioned to generate output signals (after a predetermined delay) indicative of an empty document hopper 27. The passage of a document 23 past the detector 16 will cause the circuit 17 to generate an inhibit level of zero volts which then prevents the generation of the output signals after the predetermined delay of the pulse generator, this delay being in the order of 350 milliseconds. In the embodiment of the invention that was constructed and successfully operated, the time between documents was 50 milliseconds which is much less than the delay of the pulse generator.

A principal advantage of the delayed pulse generator of this invention is its ability to utilize an already existing signal (the signal from the photodiode 16 is used for other purposes, not described here) to control the generator. This electronic embodiment herein described was found far superior to a mechanical arrangement which was discarded due to its unreliability.

A biasing voltage of —30 volts is applied through a resistor 18 to the common point comprising the cathodes of the diodes 10, 12 and 14 and the base of transistor T1. In addition, the common point at the base of transistor T1 is coupled to ground through a resistor 20. The ohmic value of resistor 18 would normally be many times greater than that of the resistor 20 so that the base voltage of the transistor T1 with the inhibit level applied would normally be closer to ground than to —30 volts.

A voltage of —8 volts is applied to the collector of the transistor T1 while a positive voltage of 20 volts is applied to the emitter of the transistor T1 through the serially coupled resistors 22 and 24. The transistor T1 is coupled in an emitter-follower configuration to a transistor T2 whose base is connected to the common point between the resistors 22 and 24. The emitter of the transistor T2 is connected directly to ground. The transistor T1 is of PNP configuration while the transistor T2 is of NPN configuration.

The collector of the transistor T2 is coupled to a positive supply of 20 volts through a resistor 25 and to the emitter of a unijunction transistor T3 through a serially connected diode 26 and a resistor 28. The unijunction transistor T3 is a three-terminal semi-conductor which possesses electrical characteristics quite different from those of conventional two-junction transistors. In addition to its great simplicity as a pulse generator in the circuit of the present invention, its highly stable negative resistance characteristic permits its application in circuits of this type. The emitter of the unijunction resistor T3 is indicated at the letter "E" while the two ohmic contacts are designated "B1" and "B2." In the circuit of the present invention, the base B1 is coupled to ground through a resistor 30 while the base B2 is connected to a positive supply such as +20 volts through a resistor 32. A variable capacitor 34 is connected to the emitter of the transistor T3, which capacitor 34 acts to control the frequency of the output signals from the transistors T4 and T5. A positive potential is coupled to the emitter of the transistor T3 through a variable resistor 36 and a serially connected fixed resistor 38.

The output of the base B1 of the transistor T3 is coupled through a capacitor 40 to the base of a transistor T5. The emitter of the transistor T5 is coupled to ground while the collector is connected to a negative voltage such as —8 volts through a resistor 42. In addition, the negative voltage is supplied to the base of the transistor T5 through a resistor 44. The output from the transistor T5 is derived at its collector via the output terminal 46. The output of the transistor T5 is a negative going square wave pulse, as shown, which is applied to signal a document processor indicated by the block 48.

The output from the base B2 of the transistor T3 is coupled to the base of a transistor T4 through a capacitor 50. A positive potential is applied to the base of the transistor T4 through a resistor 52 and the base of the transistor T4 cannot rise above approximately zero volts due to a diode 54. The emitter of the transistor T4 is connected to ground while the collector of T4 is coupled to the negative voltage of —8 volts through a resistor 56. The output of the collector of the transistor T4 is derived at the output terminal 58 and supplied as a positive rising square wave to the document processor 48 via the conductor from the terminal 58.

The operation of the circuit will now be described with reference to the figure. As previously set forth, the circuit of the present invention operates in two distinct modes: A first mode wherein output pulses from the transistor T4 and T5 are inhibited and a second mode wherein the transistors T4 and T5 are supplying a train of output pulses or signals. The modes are known as the inhibit mode and the operate mode. For the purposes of this discussion, the inhibit mode will now be explained.

It will be noted from the figure that the diodes 10, 12 and 14, the resistors 18 and 20, and the negative voltage supply form an OR circuit whose inputs are supplied on any one of the conductors coupled to the anodes of the diodes 10, 12 or 14. A source of supply suitable for operation of the circuit may be means located within or juxtaposed a document feed bin which is actuatable to signal the passage of documents. One such means is shown as the document presence detector 16 whose associated detector circuit 17 is capable of supplying a signal having the two levels, to the diode 10. During the inhibit mode, the detector circuit 17 would supply a voltage level of zero volts (indicating the passage of a document past the detector 16) to the anode of the diode 10, as shown. Under these conditions, the transistor T1 would be conducting and the switching amplifier comprising the transistor T2, which is coupled in an emitter-follower relationship with the transistor T1, would follow the transistor T1 and also be in a conducting state. The transistor T2 would actually be turned on to saturation and its collector voltage would approach the emitter voltage which is approximately zero volts as shown. Under these conditions of operation, the variable capacitor 34 could not be charged from the positive supply source as any charge accumulated on the capacitor 34 would be discharged through the resistor 28, the diode 26, to the collector of T2 and to the emitter, which is at ground, of the transistor T2. This clamping or inhibiting action of the transistor T2 inhibits the operation of the unijunction transistor T3 by holding its emitter at substantially ground potential. When the transistor T3 is in its OFF condition, no outputs are generated from the transistors T4 and T5. The condition of the output terminal 58 of the transistor T4 at this time is that it is supplying a steady level of —8 volts while the output terminal 46 of the transistor T5, which is conducting, is supplying a steady level of approximately zero volts.

In summary, in the inhibit mode (a document 23 has just passed the detector 16), a zero voltage is being supplied to the base of the transistor T1, the transistor T2 is conducting which prevents charging of the capacitor 34, the transistor T3 is off, and neither of the transistors T4 and T5 is supplying output pulses.

In its second mode, which will now be discussed, the circuit is supplying a train of output pulses to the document processor 48. The circuit enters this mode when documents are not passing the detector 16. If documents do not pass the detector 16 within an allotted time, then the presumption is that the hopper is empty, and the document processor 48 and the feeder control must be apprised of this condition, after a predetermined delay.

The frequency and the amount of the pulse delay may be adjusted by the variable capacitor 34 and/or the resistor 36. In the particular embodiment of the generator that was constructed and successfully operated, the capacitor 34 had a value of 1.0 microfarad, the resistor 36 was 1,000 ohms, while the resistor 38 was 270,000 ohms. This combination of circuit elements produced an initial delay period of approximately 350 milliseconds and a delay period of 330 milliseconds when oscillating in the operate mode.

As soon as an appropriate input signal (for example, —8 volts) has been applied to the base of the transistor T1, through one of the diode inputs 10, 12 or 14, the transistor T1, through its emitter-follower relationship to the transistor T2, would drive the transistor T2 off. Thus, the voltage on the collector of the transistor T2 would abruptly rise to approximately 20 volts and cause the diode 26 to be back biased. The capacitor 34 will now commence charging from the positive supply through the resistors 36 and 38. As soon as the capacitor 34 voltage reaches the peak point emitter voltage (which is approximately 16 volts) of the transistor T3, the transistor T3 will become conductive. The base B1 to base B2 resistance and the emitter to base B1 resistance of the unijunction transistor T3 becomes very low, in the neighborhood of one to ten ohms, and as a result, the capacitor 34 would be almost completely discharged (after it reaches the peak point emitter voltage of T3) through the emitter, base B1, and the resistor 30. This switching time is very fast, in the order of two or three microseconds, so that the peak current through the emitter, base B1 and resistor 30 is very high. In actual practice, the peak current through the resistor 30 would be in the area of one ampere.

The current through the capacitor 40 includes several milliamperes through the resistor 44 and the transistor T5 base turn-off currents. The transistor T5, acting as a switching amplifier, produces an output of a negative going pulse as shown at the terminal 46.

The foregoing described emitter to base B1 current flow of the transistor T3 is accompanied by a base B2 to base B1 current. This base B2 current flows through the resistor 32 and the capacitor 50. The negative pulse produced at the base B2 of T3 turns the transistor T4 (also acting as a switching amplifier) to its ON condition resulting in a positive output pulse at the terminal 58, as shown. The capacitors 40 and 50 function as coupling and differentiating capacitors.

After the capacitor 34 (which may be termed a "timing" capacitor) has completed its discharge and caused the foregoing outputs from the transistors T4 and T5 by triggering the transistor T3, the capacitor 34 will again begin to charge since the emitter to base B1 resistance of T3 is very high, being in the megohm range. The cycle of operation just described, the charging and discharging of the capacitor 34 and the generation of output signals from the transistors T4 and T5 to the computer 48, will continue until the switching arrangement, comprising the elements to the left of the transistor T3, are actuated by the application of the inhibit level of zero volts to one of the diodes 10, 12 or 14.

Upon application of the inhibit level, the system will revert to its first mode as previously described. In that mode, the transistor T2 will be driven to saturation. The charge accumulated on the capacitor 34 will be immediately discharged through the resistor 28, the diode 26 and the transistor T2 and thus, immediately inhibit the generation output signals. Even though the capacitor 34 has commenced charging, no output pulse would be produced upon the application of an inhibit level since the capacitor 34 would be immediately discharged. This operation is much unlike that of the operation of the delay line or one-shot multivibrator which will produce an output pulse once an input triggering or actuating pulse is applied.

The transistor T2 remains on as long as the inhibit level is applied, which prevents an accumulation of a charge on the capacitor 34. Hence, the transistor T3 remains off and a −8 volt level is supplied to the document processor 48 of the transistor T4 while a zero voltage level is supplied to the document processor 48 by the transistor T5. Signals of both polarities are applied to the document processor 48 in order that the document processor 48 may utilize either one or both of the levels. This is also true in the case of the application of pulses while in the conducting mode. Upon receipt of an input signal to the processor 48, the processor 48 may generate a feeder control signal, as shown, which may be utilized to inhibit the drive means 19 which causes the document feeder 21 to stop.

Thus, there has been described a pulse generator designed to generate an output pulse, or a series of output pulses, after a predetermined delay period. The pulse generator of the present invention will continue to supply output pulses with the predetermined time period until the direct coupled input level changes to its inhibit operation. With the input inhibit level applied (which may be caused by the passage of a document past a detector positioned along the document path), an amplifying stage is conductive which prevents the charge of a capacitor associated with the unijunction transistor stage. Hence, no outputs are generated. As soon as the input inhibit level is removed (the document has passed the document detector), the switching arrangement including the foregoing amplifying stage which is coupled to control the oscillator (the unijunction circuit), will function to permit the charging of the capacitive means coupled to control the oscillator. Output signals are now imminent. When the inhibit level is applied, this clamping or inhibiting action will stop operation of the circuit during any portion of the cycle and even though the generation of an output pulse is imminent, it will be prevented. That is to say, the input inhibit level may be applied at random and for a period of time only to allow reset of the circuit. In the embodiment which was constructed and successfully operated in accordance with the principles of this invention, the nominal delay period from the time that the input inhibit level is removed to the generation of the first output pulse was approximately 350 milliseconds. It will be understood, that means are employed along with the circuit to vary the delay period as well as the frequency and period of the output pulses.

While the invention has been particularly shown and described with reference to a preferred embodiment thereof, it will be understood by those skilled in the art that various changes in form and details may be made therein without departing from the spirit and scope of the invention.

What is claimed is:

1. Means for controlling the advancement of documents comprising a document feeder, drive means responsive to signals for cyclically operating said feeder, document advancing means juxtaposed said feeder for receiving documents from said feeder, a pulse generator for generating pulses indicative of the absence of documents at said document feeder for controlling said drive means, said pulse generator comprising a first transistor amplifying stage adapted to receive input signals, a second transistor coupled to said first transistor in an emitter-follower relationship, a unijunction transistor having an emitter, a first base and a second base, unidirectional conducting means coupled between said second transistor and said emitter, capacitive means coupled to said emitter, a source of potential for charging said capacitive means, said unidirectional conducting means providing a discharge path for said capacitive means only when said second transistor is in a conduction state, means responsive to the passage of documents providing said input signals to turn on said second transistor, a pair of output signal means, one of said pair coupled to said first base and the other of said pair coupled to said second base, and document detector means adjacent said document feeder for generating input signals to said first transistor amplifying stage to control said drive means through said pulse generator.

2. Means for controlling the advancement of documents comprising a document feeder, drive means responsive to signals for cyclically operating said document feeder, document advancing means juxtaposed said document feeder, for receiving documents from said document feeder, a pulse generator for generating pulses indicative of the absence of documents at said document feeder for disabling said drive means, said pulse generator comprising a first transistor amplifying stage adapted to receive input signals, a second transistor coupled to said first transistor in an emitter-follower relationship, a unijunction transistor having an emitter, a first base and a second base, diode means coupled between said second transistor and said emitter, capacitive means coupled to said emitter, a source of potential for charging said capacitive means, said diode means providing a discharge path for said capacitive means only when said second transistor is in a conductive state, means responsive to the passage of documents providing said input signals to turn on said second transistor, a pair of output signal means, one of said pair coupled to said first base and the other of said pair coupled to said second base, and means adjacent the document path formed by said document feeder and said document advancing means and responsive to the advancement of a document for generating signals to said first transistor amplifying stage for disabling the generation of pulses by said pulse generator.

References Cited by the Examiner

UNITED STATES PATENTS

| | | | |
|---|---|---|---|
| 3,018,384 | 1/1962 | Zrubek | 307—88.5 |
| 3,036,225 | 5/1962 | Kladde | 307—88.5 |
| 3,085,165 | 5/1963 | Schaffert et al. | 307—88.5 |
| 3,139,539 | 6/1964 | Hewett | 307—88.5 |
| 3,188,081 | 6/1965 | Lee | 271—57 X |
| 3,210,686 | 10/1965 | Rocca. | |

ROBERT B. REEVES, *Primary Examiner.*

HADD S. LANE, *Examiner.*